United States Patent [19]

Tomita et al.

[11] Patent Number: 4,728,967

[45] Date of Patent: Mar. 1, 1988

[54] RECORDING APPARATUS HAVING A TAPERED ROLLER PLATEN FOR EXERTING A UNIFORM PRESSING FORCE AGAINST RECORDING ELEMENTS

[75] Inventors: Hiroshi Tomita, Kyoto; Michio Kunimitsu, Yawata; Junji Maeda, Kyoto, all of Japan

[73] Assignee: Sanyo Electric Co., Ltd., Osaka, Japan

[21] Appl. No.: 799,987

[22] Filed: Nov. 20, 1985

[30] Foreign Application Priority Data

Nov. 28, 1984 [JP] Japan .......................... 59-180245[U]

[51] Int. Cl.$^4$ ........................................... G01D 15/24

[52] U.S. Cl. .................................. 346/136; 400/662; 226/184; 346/76 PH

[58] Field of Search ......................... 346/136, 76 PH; 226/184, 190; 400/662, 658, 651, 652, 653

[56] References Cited

U.S. PATENT DOCUMENTS 3,132,788 5/1964 Johnson ............................ 226/184

4,463,360 7/1984 Kikuchi ......................... 346/76 PH

FOREIGN PATENT DOCUMENTS 92054 12/1981 Japan .

137652 9/1983 Japan .

*Primary Examiner*—E. A. Goldberg

*Assistant Examiner*—Mark Reinhart

*Attorney, Agent, or Firm*—Wenderoth, Lind & Ponack

[57] ABSTRACT

A recording apparatus and, more particularly, a so-called thermal printer employs a thermal head as a recording head. A platen roller is in pressing engagement with the recording head and recording elements pass between the two. Biasing forces exerted on opposite ends of the recording head cause it to deform slightly. To accommodate for this deformation, the diameter of the platen roller is greater in the middle than at its opposite ends. This construction assures that both the recording head and the platen roller are pressed against each other under a uniform force, so that ink density irregularity on the recording paper, creasing of the recording paper and the ink sheet, and recording density irregularity resulting therefrom can be prevented, and thus stable recording performance can be assured.

8 Claims, 3 Drawing Figures

RECORDING APPARATUS HAVING A TAPERED ROLLER PLATEN FOR EXERTING A UNIFORM PRESSING FORCE AGAINST RECORDING ELEMENTS

BACKGROUND OF THE INVENTION

1. Field of the Invention

This invention relates to a recording apparatus and more particularly to a recording apparatus of the type having a platen roller and a recording head disposed in parallel and adapted to be pressed against each other and in which a recording paper is passed through a clearance between the platen roller and the recording head, said recording head being more specifically a thermal head.

2. Description of the Prior Art

A recording apparatus that makes a printed or graphic form of recording on a recording paper is employed in various kinds of equipment such as, for example, a typewriter, a facsimile, and a word processor. As one type of such a recording apparatus, there has been widely in practical use a heat transfer type printer wherein a heat-meltable ink coated ink sheet and a recording paper, one placed over the other, are inserted into and passed through a clearance between a roll-form platen and a thermal head, one pressed against the other, so that heat-transfer recording is effected on the recording paper.

FIG. 3 is a schematic view showing a typical arrangement of principal portions of such a heat-transfer printer.

On an ink sheet roll 1 there is wound an ink sheet 2 coated with a heat-meltable ink. One end of the ink sheet 2 is led through a clearance between a platen roll 5 and a thermal head 6 via guide rollers 3, 4, and is then further led through a clearance between a drive roller 7 and pressure roller 8 and is finally wound on a take-up roll 10 via a guide roller 9. As the drive roller 7 is rotated counterclockwise as viewed in FIG. 3, the ink sheet 2 inserted into the clearance between the drive roller 7 and the pressure roller 8 is delivered toward the take-up roll 10, so that the entire ink sheet 2 is sequentially drawn from the ink sheet roll 1 until it is fully wound up on the take-up roll 10. A recording paper not shown is inserted into the clearance between the platen roll 5 and the thermal head 6, or more specifically between the platen roll 5 and the ink sheet 2.

The thermal head 6 is rotatably supported, in a casing not shown, on a supporting shaft 11 extending in the widthwise direction of the ink sheet 2 (which is the same direction as may be sometimes referred to as the widthwise direction of the platen roll 5 and/or the thermal head 6 hereinafter, whereas the term lengthwise direction as may be referred to with respect to the thermal head 6 is the same as the lengthwise direction or passing direction of the ink sheet 2), the thermal head 6 having a width of at that of the ink sheet 2.

At both ends of the widthwise span of the thermal head 6, adjacent to the ink sheet 1, there are provided tension springs in the form of coil springs 12, 12 (only one shown in FIG. 3) which extend to nearer casing walls. Accordingly, the thermal head 6 is biased for clockwise rotation as viewed in FIG. 3 so that a portion thereof nearer to the take-up roll 10 is pressed against the platen roll 5 (along that portion of the thermal head 6 which is pressed against the platen roll 5 there are arranged heating elements in a straight line).

Therefore, by heating the heating elements selectively as the ink sheet 2 and the recording paper (not shown), both inserted in superposed relation into the clearance between the thermal head 6 and the platen roll 5, are moved forward at a constant rate, the heat meltable ink on the ink sheet 2 is transferred onto the recording paper, so that any desired characters, graphics, and the like can be printed thereon.

Now, in a the aforementioned heat-transfer type printer employing a thermal head on which heating elements are aligned over a full widthwise span of the ink sheet 2, it is necessary that the thermal head 6 must, over its full widthwise span, press under uniform force the ink sheet 2 and the recording paper against the platen roll 5. For, if the thermal head 6 on one hand and the ink sheet 2 and recording paper on the other hand are not pressed against each other under uniform force over their full widthwise span, the transfer of heat from the individual heating elements to the ink sheet 2 will not be uniform and accordingly the rate of ink melt at portions of the ink sheet 2 which correspond to the individual heating elements may vary from one portion to another, so that the ink as transferred onto the recording paper may be non-uniform in respect to density. Further, if the thermal head 6 and the platen roll 5 are not uniformly pressed against each other over the full widthwise span thereof, and their mutual pressing force is not uniform in the widthwise direction, the rate of transfer of the ink sheet 2 is likely to be non-uniform from one portion to another in the widthwise direction of the ink sheet 2, and thus creasing is likely to develop on the ink sheet 2. Any creasing developed on the ink sheet 2 may cause of irregularities in ink transfer density on the recording paper. This is true not only with the ink sheet, but also with recording paper, e.g., roll paper and folding paper in particular.

For these reasons, the surface of contact of the thermal head 6 against the ink sheet 2 is flat and the platen roll 5 has a uniform outer diameter so that the thermal head 6 and the platen roll 5 may be brought into a uniform contact condition with each other, by means of biasing, over their full widthwise span. However, when the biasing force of the coil springs 12, 12 is exerted at both ends of the widthwise span of the thermal head 6 as mentioned above, there will develop a slight amount of deformation in the thermal head 6 unless the thermal head 6 is of an ideally rigid construction, and accordingly it is inevitable that the pressing force at the center portion thereof is slightly smaller than that at both ends thereof. Therefore, however high the degree of accuracy taken in designing for flatness of the contact surface of the thermal head 6 with the ink sheet 2 and for uniformity of outer diameter of the platen roll 5, there is still a possibility that a slight amount of deformation may develop in the thermal head 6, which makes it impracticable to expect that the mutual pressing force of the thermal head 6 and the platen roll 5 is uniform over their full widthwise span.

With a view to overcoming aforesaid difficulty that the thermal head and the platen roll may not be brought into complete contact with each other, there have been proposed a few devices, such as those disclosed in Japanese Utility Model Application Laid-Open Nos. 58-92054 (1983) and 58-137652 (1983).

Of these, the device disclosed in Japanese Utility Model Application Laid-Open No. 58-92054 is that "a roller contacts with a thermal head is able to absorb some deformation of the thermal head". However, the "deformation of the thermal head" referred to in the disclosure refers to deformation inherent in each individual unit as caused in the process of manufacture, and not to any deformation due to the biasing force exerted in pressing the platen roll and the thermal head to be pressed against each other. Therefore, above-mentioned device is fundamentally different in concept from the present invention which is intended to solve the problem of deformation caused when a thermal head having its heating elements arranged with high planar accuracy is subjected to biasing forces at both ends at the widthwise span thereof abuts with a platen roll having a uniform outer diameter that is very accurately dimensioned. With the device of Japanese Utility Model Application Laid-Open No. 58-92054, therefore, suitable measures have to be taken according to the quantity of deformation inherent in each thermal head and configuration thereof.

The device disclosed in Japanese Utility Model Application Laid-Open No. 58-137652 is such that "the shaft diametrical size of a platen roll is gradually reduced from a portion adjacent the middle of the length (shaft length) of the roll toward either end thereof and that the outer periphery of the shaft is formed of the same rubber material". Accordingly, the deformation of the rubber in the median portion of the roller along the shaft length thereof is relatively small, and that at both ends of the axial lengthwise span thereof is relatively large; thus, it is claimed that the platen roll and the thermal head can contact each other and have a uniform force exerted therebetween over their entire widthwise span. With this device, however, the shaft of the platen roll must be processed so that its outer diameter is large at its center portion and small at its both ends. Further, it is necessary that the inner periphery of a cylindrical rubber sleeve fitted over the processed shaft must be processed accordingly. Therefore, both the shaft and sleeve must to be processed with high accuracy, which result in a higher product cost.

SUMMARY OF THE INVENTION

This invention has been made in view of the above described state of the prior art.

Accordingly, it is a first object of the invention to provide a recording apparatus which can assure complete contact of a recording head, or more particularly a thermal head, with a platen roll under a uniform pressing force over their full widthwise span (i.e., over the axial length of the platen roll).

It is a second object of the invention to provide a recording apparatus which is free from the possibility of recording print having an uneven ink density.

It is a third object of the invention to provide a heat transfer type printing apparatus which prevents any irregularity in the transfer of the ink sheet and the recording paper and thereby ink can be satisfactorily delivered to the recording paper without any creases in the recording paper or ink sheet or any ink density uneveness.

It is a fourth object of the invention to provide a recording apparatus which is easy and inexpensive to manufacture and which assures complete contact of the recording head with the platen roll under uniform pressure over their full widthwise span.

The above and further objects and features of the invention will be more fully apparent from the following detailed description with reference to accompanying drawings.

DETAILED DESCRIPTION OF THE INVENTION

Figure 1:
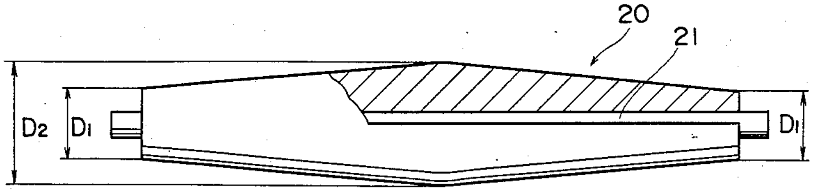
FIG. 1 is a plan view, partially cut away, showing a platen roll of the recording apparatus according to the present invention.

FIG. 1 is a plan view, partially cut away in the vicinity a shaft 21, showing a platen roll 20 of the recording apparatus of the present invention.

The platen roll 20 comprises a shaft 21 and a roll fitted thereon. The roll is formed of an elastic material such as, for example, synthetic rubber, which preferably has a rubber hardness of $20^\circ \sim 50^\circ$ (as measured by a spring-type hardness tester, Type A according to JIS). The outer diameter of the platen roll 20 is largest at its axially median portion $D_2$ and is gradually reduced toward both ends thereof, being smallest at the both ends, $D_1$ ($D_1$ is of equal value at both ends). The sectional configuration of the platen roll 20 along the shaft 21 is generated by straight lines, in other words, the outer peripheral lines as seen in a sectional view are straight. The difference between the largest outer diameter $D_2$ at the median portion and the smallest outer diameter $D_1$ at either end ($D_2 - D_1$) is $70 \sim 110$ $\mu$m as compared to the axial length of the platen roll 20 of about 300 mm which is equivalent to A3 size (sizes on the shorter side of A3 size or on the longer side of A4 are available for recording). If the axial length is equivalent to A4 size (sizes on the shorter side of A4 or on the longer side of B5 are available for recording), the above-mentioned difference is $40 \sim 70$ $\mu$m as compared to the axial length of about 260 mm.

Figure 3:
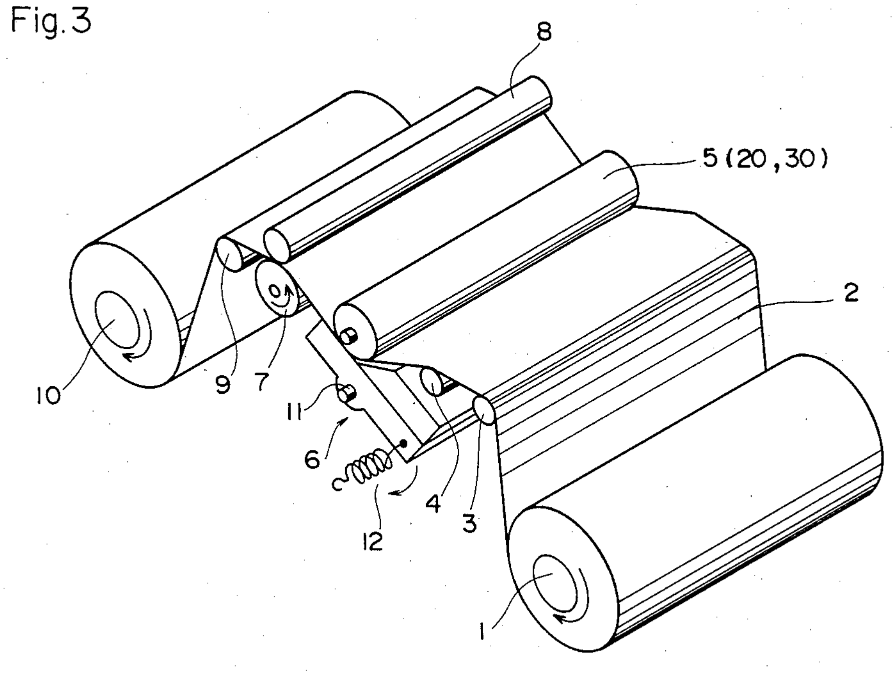
FIG. 3 is a schematic view showing a general arrangement of principal portions of a conventional recording apparatus to which the present invention is applied.

In the arrangement of the recording apparatus according to the present invention is similar to that of the conventional recording apparatus shown in FIG. 3. The apparatus of the invention is different from the conventional apparatus in that aforesaid platen roll 20 is employed instead of the conventional platen roll 5. In mounting the platen roll 20, it should be preferably positioned so that its largest diameter portion $D_2$ corresponds to the widthwise center portion of the thermal head 6.

As stated above, one difficulty with the conventional recording apparatus is that since the biasing force of the coil springs 12, 12 for causing the thermal head 6 to be pressed against the platen roll 5 is exerted at both ends in the widthwise span of the thermal head 5, the pressing force against the platen roll 20 at the median portion of the widthwise span of the platen 20 is weak as compared with that at both ends. In the recording apparatus of the present invention, however, the outer diameter $D_2$ of the platen roll 20 at the axially median portion thereof is larger by $70 \sim 110$ $\mu$m, for example, or $40 \sim 70$ $\mu$m than the outer diameter $D_1$ at both ends, and accordingly the platen roll 20 is elastically deformable. Therefore, the pressing force exerted between the platen rc[11] 20 and the thermal head 6 pressed against each other at the median portion of the former is substantially larger than that of the conventional apparatus. At both ends in the axial directional span of the platen roll 20, as is the case with the conventional apparatus, the platen roll 20 is subjected to a strong pressing force due to the deformation of the thermal head 6 as a result of the biasing force of the coil springs 12, 12 being exerted at both ends in the widthwise span of the thermal head 6. In the recording apparatus according to the present invention, therefore, the pressing force of the platen roll 20 and the thermal head 6 against each other is generally uniform over their full widthwise span.

Figure 2:
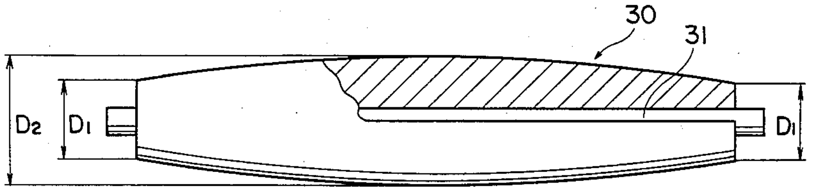
FIG. 2 is a plan view, partially cut away, showing another form of a platen roll of the recording apparatus according to the present invention.

FIG. 2 is a plan view, partially cut away in the vicinity of a shaft 31, showing a platen roll 30 employed in another embodiment of the present invention.

The platen roll 30 is basically identical in configuration with the platen roll 20 shown in FIG. 1, but its sectional configuration taken along the shaft 31 is different from the corresponding configuration of the platen roll 20. That is, the generating line of the platen roll 30 is curved (e.g., circular, elliptical, or parabolic).

The barrel-shaped platen roll 30 shown in FIG. 2 is mounted for use in the apparatus of the invention in the same way as the platen roll 20 shown in FIG. 1. Again, it is pressed against the thermal head 6 for contact therewith in the same manner as the platen roll 20 shown in FIG. 1.

In the recording apparatus according to the invention, as above described, the platen roll and the thermal head are pressed against each other by a generally uniform force over their full widthwise span. Thus, the ink transferred onto the recording paper is free of uneveness of density and stable delivery of the ink sheet and of the recording paper can be assured. Hence, there is no possibility of the development of creases on either of the recording elements, i.e. the ink sheet or recording paper, nor is there any possibility of the occurrence of irregular ink density.

Furthermore, the recording apparatus of the invention is simple in construction with the outer diameter of the platen roll being largest at the median portion of its axial lengthwise (i.e., widthwise) span and smallest at its both ends, which means that the apparatus is easy and inexpensive to manufacture and that high dimensional accuracy can be easily achieved with the apparatus.

As an alternative to the above described sectional configurations of the platen roll, the platen roll may be configured in such a way that it has the same outer diameter over a certain distance at its middle portion, its outer diameter being gradually reduced from both ends of said same diameter portion toward both extremities of the platen roll.

Needless to say, this invention may be applied to a recording apparatus of the type in which the recording element is a heat sensitive paper which is subjected directly to heat to change color for recording, instead of a heat meltable ink on the ink sheet being transferred onto the recording paper.

In the foregoing embodiments, no mention is made of the color of ink on the ink sheet, but it is of course possible to use a variety of single color ink sheets, e.g., black, red, and blue. It is also possible to apply the invention to a recording apparatus of the type employing an ink sheet for color printing having three primary color inks, such as yellow, magenta, and cyanogen (black also), in sequence.

Again, in the foregoing embodiments, biasing force is exerted at both ends of the recording head or thermal head and toward the platen roller so that the thermal head and the platen roll are pressed against each other contact; but, it is also possible that the recording head is stationary and biasing forces are exerted at both ends of the axial lengthwise span of the platen roll so that the platen roll and the thermal head are pressed against each other into contact; or as another alternative, both the platen roll and the recording head are simultaneously biased and pressed against each other into contact.

As this invention may be embodied in several forms without departing from the spirit of essential characteristics thereof, the present embodiment is therefore is illustrative and not restrictive. Since the scope of the invention is defined by the appended claims rather than by the description preceding them, all changes that fall within meets and bounds of the claims, or equivalence of such meets and bounds thereof are therefore intended to be embraced by the claims.

What is claimed is:

1. A recording apparatus comprising:

a non-rigid recording head over which a sheet-like recording element means is passed, said recording head having opposite ends adjacent opposite side edges of the recording element means respectively;

a roller-form platen in pressing engagement with said recording head, the recording element means passing between said roller-form platen and said recording head, said roller-form platen having an axis of rotation extending perpendicular to the direction in which the recording element means passes over the recording head, said roller-form platen having an axial length as measured along said axis of rotation that is at least as long as the recording element means is wide, and said roller-form platen having opposite ends adjacent the opposite side edges of the recording element means respectively;

biasing means connected to said recording head and/or said roller-form platen for pressing said recording head and said roller-form platen against each other by exerting respective biasing forces at said opposite ends of said recording head thereby slightly deforming said non-rigid recording head; and said roller-form platen having an outer diameter that is largest at a median portion thereof that is between said opposite ends of the roller-form platen, said outer diameter of said roller-form platen at said median portion being larger than each of the outer diameters of the roller-form platen at said opposite ends thereof for pressing against and maintaining a uniform pressing force across the entire width of the sheet when the recording head deforms slightly when subjected to the respective biasing forces.

2. A recording apparatus as claimed in claim 1, wherein said recording head is a thermal head.

3. A recording apparatus as claimed in claim 1, wherein said median portion of said roller-form platen is arranged relative to said recording head such that said median portion presses against the recording element means at a location thereon that is mid-way between said opposite side edges as the recording element means passes over said recording head.

4. A recording apparatus as claimed in claim 1, wherein the difference in the outer diameter between either of said opposite ends of said roller-form platen and the median portion thereof is between approximately 70 and 100 μm.

5. A recording apparatus as claimed in claim 1, wherein the difference in the outer diameter between either of said opposite ends of said roller-form platen and the median portion thereof is between 40 and 70 μm.

6. A recording apparatus as claimed in claim 1, wherein said roller-form platen is comprised of a synthetic rubber having a rubber hardness of between 20 and 50 degrees as measured by a spring-type hardness tester, type A according to JIS (Japanese Industrial Standard).

7. A recording apparatus as claimed in claim 1, wherein said roller-form platen is tapered at a constant rate from the median portion thereof toward each of said opposite ends thereof such that lines generating a sectional configuration of said roller-form platen taken along the rotational axis thereof are straight.

8. A recording apparatus as claimed in claim 1, wherein said roller-form platen is tapered in a smooth curve-like manner from the median portion thereof toward each of said opposite ends thereof such that lines generating a sectional configuration of said roller-form platen taken along the rotational axis thereof are curved.

* * * * *